March 14, 1967 D. S. DONIGIAN 3,309,459

COLOR TELEVISION SERVICING INSTRUMENT

Filed May 20, 1965 3 Sheets-Sheet 1

INVENTOR
DONALD S. DONIGIAN

BY Alberts, Brezina & Lund
ATTORNEYS

March 14, 1967 D. S. DONIGIAN 3,309,459

COLOR TELEVISION SERVICING INSTRUMENT

Filed May 20, 1965 3 Sheets-Sheet 2

INVENTOR
DONALD S. DONIGIAN
BY Alberts, Brezina & Lund
ATTORNEYS

INVENTOR

DONALD S. DONIGIAN

BY Alberts, Brezina + Lund

ATTORNEYS 3,309,459

COLOR TELEVISION SERVICING INSTRUMENT

Donald S. Donigian, 6016 W. Fullerton, Chicago, Ill. 60639

Filed May 20, 1965, Ser. No. 457,413
20 Claims. (Cl. 178—5.4)

This invention relates to a color television servicing instrument and more particularly to a comparatively simple and yet very effective, reliable and versatile instrument for permitting rapid and precise adjustment of operating voltages, gain controls, convergence magnets and convergence circuits to obtain optimum performance of a color television receiver.

This application is a continuation-in-part of my copending application, Ser. No. 346,939, filed Feb. 24, 1964. As described in that application, various adjustments must be made to a color television receiver to produce what is known as "black and white tracking," such that a black and white or monochrome picture is produced in response to a received signal having no color information signal components. Such adjustments have been made by visual observation and according to the judgment of each individual technician and his visual acuity to color and brilliance differences, producing wide variations in results. Further, the processes of adjustment have been complicated, repetitious under varying conditions, subject to a myriad of variables and fatiguing to the eye and subject to error. Recommended procedures vary from manufacturer to manufacturer.

Additional difficulties and problems are encountered in connection with adjustments of convergence circuits of a color television receiver. To facilitate making such adjustments, instruments have been provided for generating signals to produce certain patterns on the screen of the color kinescope. Such adjustments have been quite complicated and expensive and/or have not generated the patterns with the required degree of stability and reliability, and even with the the best of the prior instruments, the adjustments have still been difficult and time-consuming and subject to inaccuracies, and have severely strained the eyes of the technician.

This invention was evolved with the general object of eliminating such problems and irritations and in accordance with this invention, an instrument is provided which is comparatively simple and inexpensive in construction and operation and yet very effective, reliable and versatile, enabling the adjustments to be made rapidly, accurately and uniformly with minimum eye-strain.

My aforesaid copending application discloses and claims an instrument and method for adjustment of black-and-white tracking. In brief, photocell means are disposed adjacent a portion of a color kinescope screen and are connected to measuring means for indicating the respective light outputs from the phosphors of the screen, with calibration means being associated with the measuring means for permitting adjustment of operating voltages of the guns to obtain predetermined light outputs from the respective phosphors while no luminance signals are applied to the guns.

Preferably, the photocell means comprises a photoconductive type of cell having an internal resistance which varies with illumination intensity, and having unequal responses to light from the phosphors of different colors, with such unequal responses being taken into account by the calibration means.

With the particular form of instrument disclosed in the aforesaid copending application, switch means are set in a first position and an operating voltage of a first gun is adjusted to obtain a certain meter reading, the switch means are then set in a second position and an operating voltage of a second gun is adjusted to obtain the same meter reading, and finally the switch means are set in a third position while an operating voltage of a third gun is set to again obtain the same meter reading.

With such arrangements, it is possible to rapidly obtain black-and-white tracking with a high degree of accuracy and uniformity, and without the eye-strain associated with prior instruments.

The aforesaid copending application discloses other features, including the provision of a circuit arrangement for substantially eliminating the effect of stray light on the measurements.

This invention relates to an instrument having the same features as disclosed in the aforesaid application and having additional features cooperating to provide an instrument which is compact, comparatively simple and inexpensive in construction, and yet very reliable and very versatile. The instrument is usable for the adjustment of convergence magnets and convergence circuits, as well as for adjustment to obtain black-and-white tracking.

An important feature is in the measurement of the amplitude of the high voltage applied to the kinescope from a fly-back supply. In accordance with this feature, a conductor is placed adjacent the screen to develop by electrostatic coupling a signal having an amplitude functionally related to the magnitude of the high voltage, the amplitude of the signal being measured.

Additional important features of the instrument relate to a signal generator for developing patterns on the color kinescope screen to facilitate adjustment of the convergence magnets and circuits.

One of such features relates to the production of horizontally spaced vertical lines on the screen of the color kinescope, by causing application of pulses from the video amplifier of the receiver to the kinescope, developed in response to pulses from a multivibrator operated at the frequency equal to a multiple of the line rate. In accordance with this feature, pick-up means are disposed adjacent the kinescope screen to derive therefrom a control signal at the line rate, and the control signal is applied to the multivibrator to synchronize the operation of the multivibrator with the horizontal deflection circuit of the receiver. With this arrangement, vertical lines are developed with a high degree of stability. It is here noted that the term "multivibrator" is used in a generic sense to include any form of oscillatory circuit the operation of which may be synchronized by application of a control signal thereto.

Preferably, and in accordance with a specific feature of the invention, the pick-up means is in the form of a conductor placed closely adjacent a surface portion of the kinescope screen and it may preferably be the same conductor used for the high voltage measurement. It is found that with such a conductor, a control signal of substantial amplitude is developed at the line rate, apparently through electrostatic coupling to the scanning beam of the kinescope. Most preferably, the housing of the photocell means is used as the conductor of pick-up means, so that the photocell means thus performs the triple function of providing measurement of the phosphor outputs for black-and-white tracking, in providing the control signal for synchronization of the operation of the multivibrator with the horizontal deflection circuit and in providing a signal for high voltage measurement.

Another feature of the signal generator is in the provision of a second multivibrator for developing pulses at a multiple of the field rate, with means responsive to such pulses for applying a signal to the receiver to develop corresponding pulses within the receiver applied to the kinescope and also applied to the vertical deflection circuit to synchronize the operation of the vertical deflection circuit with the operation of the second multivibrator. With this arrangement, vertically spaced horizontal lines are developed on the kinescope screen, and with the first multivibrator operative, a cross-hatch pattern is developed. It is known in the art that such a cross-hatch pattern is highly advantageous in facilitating adjustment of the convergence magnets and convergence circuits, but the prior art cross-hatch generators have generally been quite complicated and expensive or have been unstable and unreliable. With the generator of this invention, however, a highly stable pattern is developed and with very simple circuitry, based upon the operation of only two multivibrators.

Preferably, and in accordance with another specific feature of the invention, the output pulses from the first and second multivibrators are applied through a mixer circuit to modulate the output of an oscillator operated at the frequency of one of the standard channels, which may be an unused channel in the particular area wherein the servicing of the color television receiver is performed. The output of the oscillator may be picked up by the antenna of the receiver, or may be applied to the antenna input terminals of the receiver, and no internal connections to the receiver are required.

Another specific feature of the invention is in the provision of a rainbow generator, preferably in the form of a crystal oscillator coupled to modulate the output of the oscillator of the signal generator portion of the instrument.

Another very important feature of the signal generator portion of the instrument is in the provision of means for producing dark areas of substantial width above and below certain of the scanning lines, preferably those lines brightened in response to the pulses generated at a frequency equal to a multiple of the field rate. It is found that by producing dark areas above and below such scanning lines, it is much easier to observe whether or not convergence is established along such lines, the convergence can consequently be performed much more rapidly and with a much higher degree of accuracy, and without the eye-strain associated with prior instruments.

According to a specific feature of the invention, such dark areas are produced by causing abrupt increases in the vertical sweep, to cause vertical spreading of lines during such abrupt increases. Most preferably, such abrupt increases are produced by applying a signal to the receiver effective to apply pulses to the vertical deflection circuit of a relatively high amplitude. Such pulses are thus effective to both synchronize the operation of the vertical deflection circuit and to cause vertical spreading of lines, with dark areas being produced above and below certain of the lines.

Further important features of the invention relate to methods of adjustment of a color television receiver, using the instrument of this invention, to obtain optimum performance with minimum effort.

Still other features of the invention relate to the mounting of the photocell means by means of a suction cup arrangement and to a light shield, for minimizing the effect of stray light on the measurements.

This invention contemplates still other objects, features and advantages which will become more fully apparent from the following detailed description taken in conjunction with the accompanying drawings which illustrate preferred embodiments and in which.

Figures 1, 3:
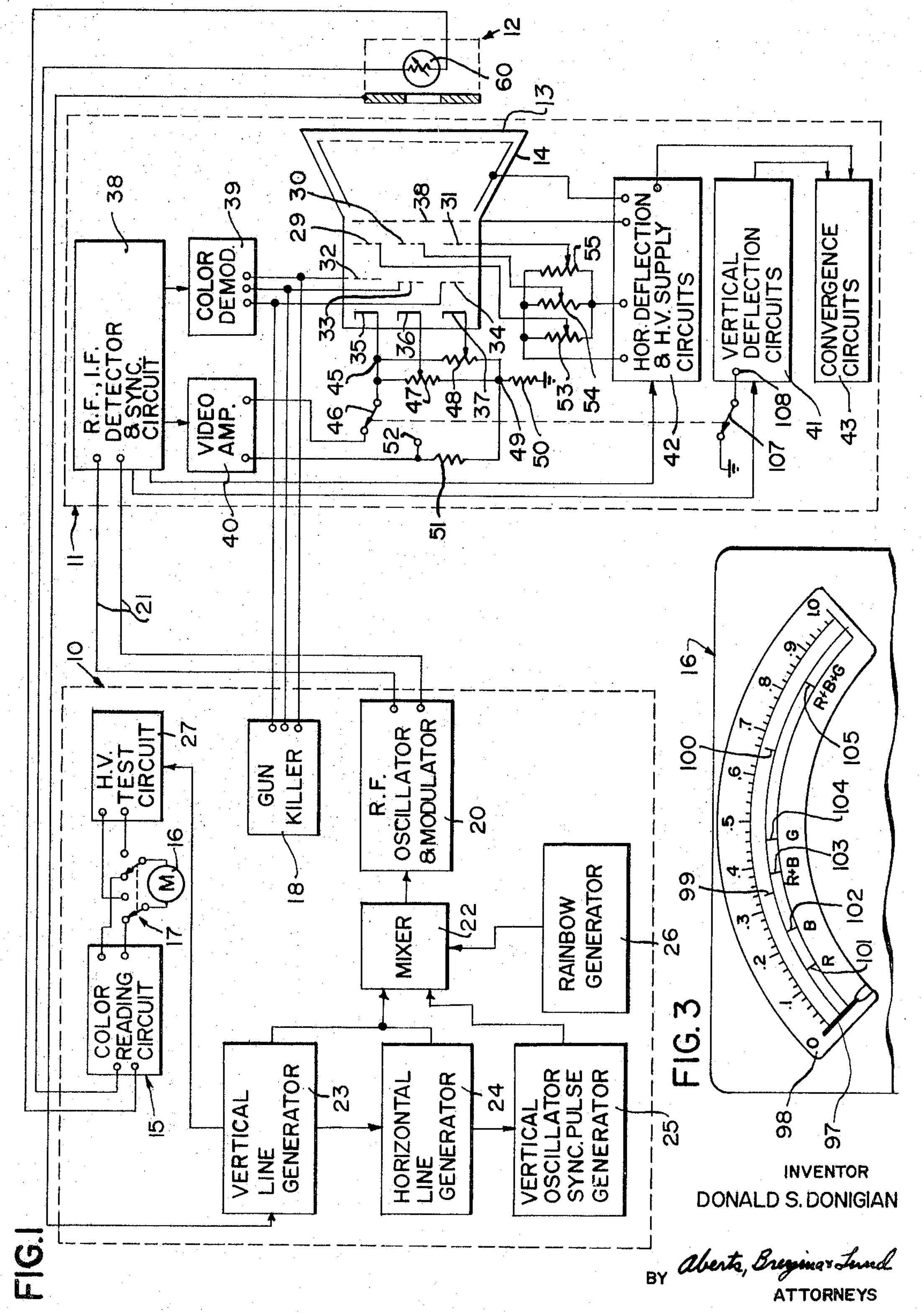
FIGURE 1 is a schematic diagram showing a color television receiver and a servicing instrument constructed according to the invention and connected to the receiver.
FIGURE 3 illustrates the face of a meter of the instrument shown schematically in FIGURE 1.

Referring to FIGURE 1, reference numeral 10 generally designates a color television servicing instrument constructed according to the principles of this invention and connected to a color television receiver generally designated by reference numeral 11.

The instrument 10 includes a photocell unit 12 which is positioned adjacent a portion of a screen 13 of a color kinescope 14 of the receiver 11, the unit 12 being connected to a color measurement or reading circuit 15 which is connected to a meter 16 through a selector switch 17. With the color reading circuit 15, operating in conjunction with a gun killer 18, black-and-white tracking of the receiver may be adjusted.

The instrument also is operative to develop a cross hatch pattern on a screen 13, for adjustment of convergence circuits and other circuits. For this purpose, an RF oscillator and modulator circuit 20 has output terminals connected through lines 21 to antenna input terminals of the receiver 11 and has an input connected to the output of a mixer 22 which has inputs connected to outputs of a vertical line generator 23, a horizontal line generator 24 and a vertical oscillator synchronizing pulse generator 25.

The instrument 10 additionally comprises a rainbow generator 26 which is connected to the mixer 22, to operate through the RF oscillator and modulator circuit 20 to develop a rainbow pattern on the screen 13.

The instrument 10 further comprises a high voltage test circuit 27 which is connectable to the meter 16 through the selector switch 17 and which is connected to the vertical line generator 23, to utilize a portion of the circuitry thereof, in a manner as described in detail hereinafter.

Before describing the circuits of the instrument 10 in detail, it is noted that the color kinescope 14 of the illustrated receiver 11 is of a conventional type having three electron guns and a shadow mask behind the screen 13, which has phosphors of three colors to be impinged by the beams from the three electron guns. It is here noted that although the illustrated instrument is specifically designed for testing of this type of receiver, it is not necessarily limited thereto and can be used with receivers of other designs.

The three electron guns of the kinescope 14 have screen grids 29, 30 and 31, control grids 32, 33 and 34 and cathodes 35, 36 and 37. A focusing grid 38 is also provided.

The illustrated receiver 11 additionally includes RF, IF, detector and synchronizing circuits 38 having antenna terminals connected to the lines 21, and having outputs connected to a color demodulator circuit 39, a video amplifier circuit 40, a vertical deflection circuit 41, and horizontal deflection and high voltage supply circuits 42. In addition, convergence circuits 43 are provided, connected to outputs of the verticle reflection circuits 41 and the horizontal deflection and high voltage circuit 42.

The cathode 35 of one of the electron guns is connected to a circuit point 45 which is normally connected through a set-up switch contact 46 to an output terminal of the video amplifier 40, while the cathodes 36 and 37 of the other two electron guns are connected to movable contacts of gain adjustment potentiometers 47 and 48, connected between circuit point 45 and a circuit point 49 which is connected through a resistor 51 to a power supply terminal 52, terminal 52 being also connected to the video amplifier 40.

It may be noted that with this gain adjustment circuit as illustrated, the signal or drive from the video amplifier 40 applied to cathodes 36 and 37 can equal but never exceed the signal applied to the cathode 35. The electron gun having the cathode 35 is therefore associated with the phosphor having the least efficiency, which is usually the red phospor, but in some cases may be the blue phosphor, or conceivably the green phosphor, although the green phosphor is generally quite efficient.

The focusing grid 38 is connected to an output terminal of the horizontal deflection and high voltage supply circuit 42, while the screen grids 29, 30 and 31 are connected to movable contacts of three potentiometers 53, 54 and 55, connected between additional output terminals of the horizontal deflection and high voltage supply circuit 42. The focusing grid 38 may be supplied with a voltage on the order of 5,000 volts, while the terminals connected to the potentiometers 53–55 may supply voltages on the order of 400 and 750 volts relative to ground.

The photocell unit 12 comprises a photo-conductive type of cell 60 having an internal resistance which varies with the intensity of light thereon, and also having unequal response characteristics with respect to the light of different colors from the phosphors of the screen 13. The unequal response characteristic is not essential, but is an inherent characteristic of available photo-conductive cells and with the use of the calibration means of this invention, does not detract from the accuracy of the measurements.

Figure 2:
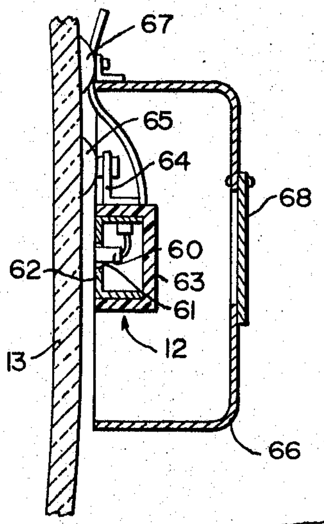
FIGURE 2 is a cross-sectional view of a portion of a screen of a color kinescope of the receiver shown schematically in FIGURE 1, also showing in cross-section a photocell unit of the servicing instrument, together with a light shield.

As shown in FIGURE 2, the photocell 60 is mounted by means of a plastic or rubber ring 61 in an opening in a member 62 of metal or other conductive material, disposed within one end of a housing 63 of plastic or other insulating material. One wall of the housing 63 is secured to one end of an L-shaped bracket 64, the other end of which is secured to a suction cup 65 arranged to be pressed against the face of the screen 13 of the color kinescope tube 14, to hold the cell 60 in a desired position.

As described hereinafter, circuit means are provided for compensating for the effect of ambient light upon the measurements, but to further obviate the effect of ambient light, and particularly where the ambient light is strong, a shield 66 may be disposed over the unit 12, the shield 66 being supported from the face of the screen 13 by a suction cup 67. The shield 66 may preferably be of a flexible material and may double as a protective cover for the instrument when it is not in use, with a flap 68 being provided for covering an opening through which a handle of the instrument extends.

Figure 4:
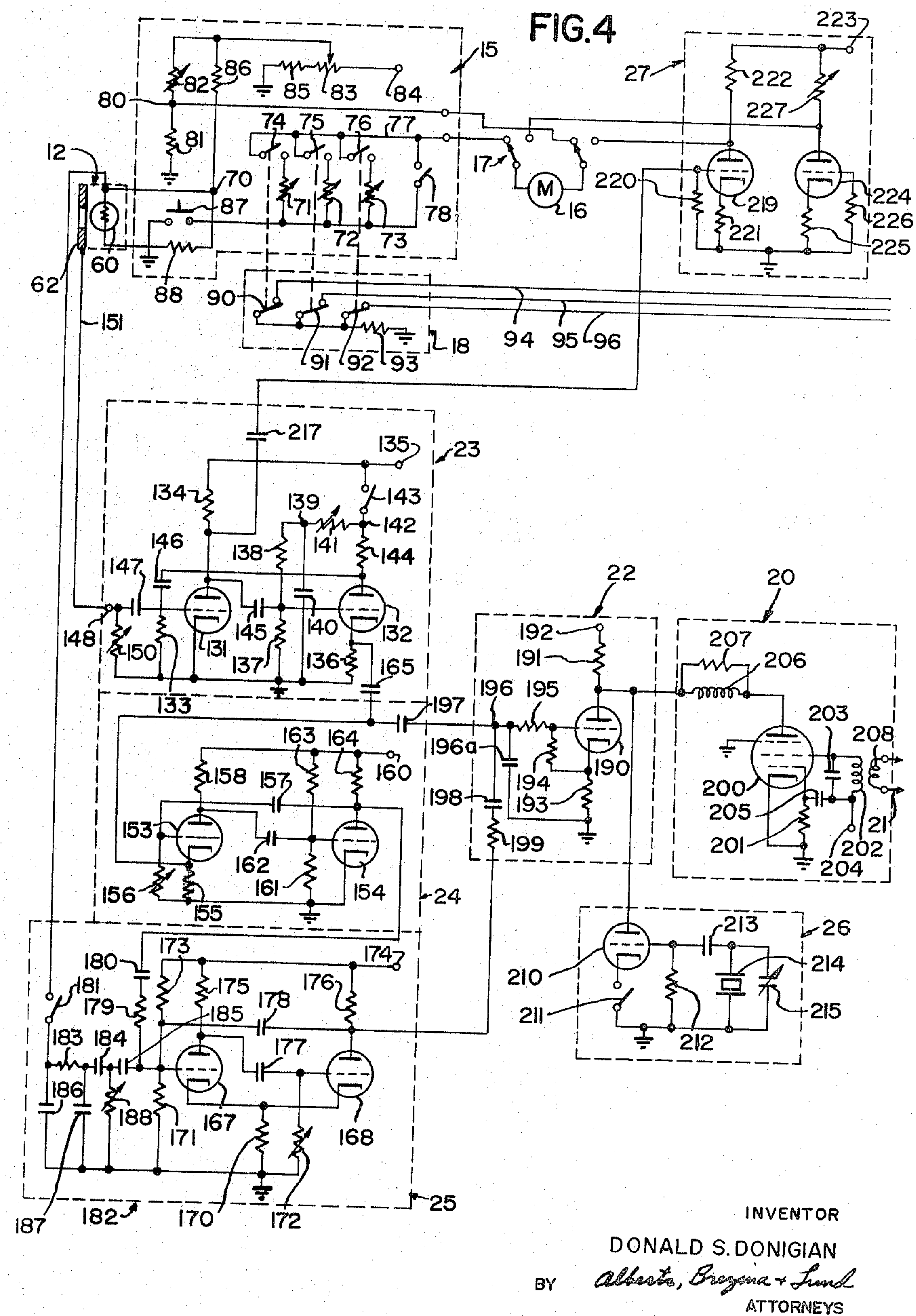
FIGURE 4 is a circuit diagram of the instrument of FIGURE 1.

Referring to the circuit diagram of FIGURE 4, one terminal of the photocell 60 is connected to ground and the other terminal thereof is connected to a circuit point 70 which is connected through adjustable calibration resistors 71, 72 and 73 to fixed switch contacts arranged to be engaged by movable switch contacts 74, 75 and 76, which are connected to a line 77 to be connected through one contact of the selector switch 17 to one terminal of the meter 16. A switch 78 is connected between line 77 and the circuit point 70.

The other terminal of the meter 16 is connected through the other contact of the selector switch 17 to a circuit point 80 which is connected to ground through a resistor 81 and which is connected through an adjustable resistor 82 to the movable contact of a potentiometer 83 connected at one end to a power supply terminal 84 and at the other end through a resistor 85 to ground. An additional resistor 86 is connected between circuit point 70 and the movable contact of potentiometer 83 while a push button switch 87 and a resistor 88 are connected between circuit point 70 and the ground.

The switch contacts 74, 75 and 76 are preferably ganged to switch contacts 90, 91 and 92 in the color killer circuit 18, the contacts 90, 91 and 92 being connected together and through a resistor 93 to ground.

The contacts 90, 91 and 92 are engageable with fixed contacts which are connected through lines 94, 95 and 96 to control grids 32, 33 and 34 of the color kinescope 14 in the receiver 11.

As shown in FIGURE 3, the meter 16 comprises a conventional pointer 97 movable over a scale 98 having three portions. The first portion is calibrated from 0–1 milliampere, the second portion has calibration marks 99 and 100, respectively corresponding to 0.333 milliampere and 0.667 milliampere, and the third portion has a series of calibration marks, including a red or R mark 101, a blue or B mark 102, a $R+B$ mark 103, a G mark 104, and an $R+B+G$ mark 105.

The use made of such scale portions depends upon the method of adjustment of the television receiver which is used, the instrument being highly flexible and versatile and capable of use in a number of different methods.

As an example of one preferred method of adjustment, degaussing and purity check procedures are initially performed on the receiver and conventionally carried out. The set-up switch 46 is then set in a position opposite that illustrated, to disconnect the output of the video amplifier 40 from the circuit point 45. At the same time, a second set-up switch 107, ganged to the switch 46 connects a terminal 108 of the vertical deflection circuit 41 to ground to collapse the vertical sweep, a single horizontal line is then produced midway between the lower and upper ends of the screen 13, and the photocell 60 should be positioned opposite the lines so produced.

At this point, the gain control potentiometers 47 and 48 may be set at approximately mid-range positions, or the manufacturer's instructions may be followed.

The switches 90, 91 and 92 are then set in positions as illustrated, to kill all three of the guns. Switch 78 is then closed, and the resistor 82 is adjusted until the bridge is balanced, with a zero reading being produced on the meter 16. The switch 87 is then closed while potentiometer 83 is adjusted to produce a full scale reading on the meter 16. Preferably, these adjustments are repeated if required. With such adjustments, the effect of ambient light on the measurements is minimized.

The instrument is then in condition for black-and-white tracking adjustment. Switch 90 may then be moved to a position opposite that illustrated to render the corresponding gun operative, which may be assumed to be the red gun. Switch 74 is simultaneously closed to connect resistor 71 in circuit with the meter 16. The potentiometer 53 is then adjusted until a predetermined current flows through the meter 16, which may occur when the needle 97 is opposite the mark 99 of the meter scale.

Next, the switch 90 is moved back to the illustrated position, and switch 91 is moved to a position opposite that illustrated to render the second gun operative, which may be assumed to be the blue gun. Switch 75 is simultaneously closed. The corresponding screen voltage adjustment potentiometer 54 is then adjusted until a predetermined current flows through the meter 16, with the pointer 97 opposite the mark 99.

Finally, the switch 91 is moved back to the illustrated position, and switch 92 is moved to a position opposite that illustrated to render the third gun operative, which may be assumed to be the green gun. The corresponding screen voltage adjustment potentiometer 55 is then adjusted until the predetermined current flows through the meter 82, with the pointer 97 opposite the mark 99.

With this method, the receiver is then adjusted for black-and-white tracking, provided that the calibration resistors 71, 72 and 73 were initially set at the proper positions. The initial setting of the compensation resistors 71, 72 and 73 may be performed by reversing the method, with the receiver being adjusted visually by an expert technician to obtain a pure white line on the screen 13, or to obtain a slight blue or other hue, if such is desired. Following that adjustment, the switches 90, 91 and 92 and switches 74, 75 and 76 gauged thereto are sequentially moved to positions opposite those illustrated and the corresponding resistors 71, 72 and 73 are adjusted to obtain the same meter reading in each case.

As a second method, the same steps may be followed as in the example above, except that when the switches 90 and 74 are moved to positions opposite those illustrated, the switches 91 and 75 are also moved to positions opposite those illustrated so that two guns are then operative. The screen voltage adjustment potentiometer 54 is then adjusted until the meter indicates twice the current indicated with only one gun operative, the pointer 97 being then disposed opposite the mark 100. The switches 92 and 76 are then operated so that all three guns are operative. The screen voltage adjustment potentiometer 55 is then adjusted until a current of thrice magnitude is indicated, i.e. a full scale meter reading.

In a third method, the gun killer unit 18 is not used and after degaussing and purity checks, the set-up switches 46 and 107 are placed in positions opposite the illustrated positions after which the gain controls 47 and 48 are set at mid-range, or the manufacturer's instructions are followed in this respect.

The screen voltage adjustment potentiometers are then moved to low voltage positions to kill all three electron guns. The above described ambient light adjustment is then performed. The switch 74 is then closed to connect the resistor 71 in circuit with the meter 16.

The screen voltage adjustment potentiometer 53 is then adjusted to render the red gun operative and to produce a predetermined meter reading, as when the pointer 97 is opposite the "R" mark 101, shown in FIGURE 3. Potentiometer 54 is then adjusted to render the blue gun operative, until another predetermined meter reading is obtained, as when the pointer 97 is opposite the "$R+B$" mark 103, and finally the potentiometer 55 is adjusted until a third predetermined meter reading is obtained, as when the pointer 97 is opposite the "$R+B+G$" mark 105. The receiver is then properly adjusted for black-and-white tracking, provided of course that the marks 101, 103, and 105 are properly positioned. To initially determine the position of the marks 101, 103 and 105, the procedure may be reversed, with the receiver being initially adjusted by an expert and the mark 105 being positioned opposite the pointer 97 with all three guns on, with mark 103 being then positioned opposite the pointer 97 with only the red and blue guns on, and with mark 101 being positioned opposite the pointer 97 with only the red gun on.

Figure 5:
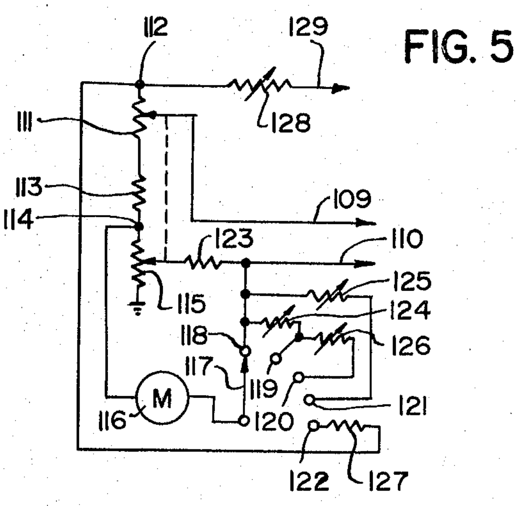
FIGURE 5 shows a modification of a color reading or measurement circuit of the instrument shown in FIGURE 1.

FIGURE 5 shows a modification of the color measurement circuit shown in FIGURE 1, wherein a pair of conductors 109 and 110 are connected to the photocell 60. Conductor 109 is connected to the movable contact of a potentiometer 111 having one terminal connected to a circuit point 112 and having an opposite terminal connected through a resistor 113 to a circuit point 114 connected through a potentiometer 115 to ground. The circuit point 114 is connected through a meter 116 to a movable selector switch contact 117 selectively engageable with fixed contacts 118, 119, 120, 121 and 122. Contact 118 is connected to the conductor 110 which is connected through a resistor 123 to the movable contact of potentiometer 115 and is also connected through a resistor 124 to the contact 119 and through a resistor 125 to the contact 121. A resistor 126 is connected between contacts 119 and 120 and a resistor 127 is connected between contacts 122 and circuit point 112 which is connected through an adjustable resistor 128 to a line 129, connected to the power supply terminal 84 (FIGURE 4).

The operation is similar to that of FIGURE 1. The switching unit 18 is again used, except that the switches 74–76 are not used, their functions being performed by the selector switch contact 117 and associated fixed contacts 118–122.

With a color television receiver adjusted to obtain optimum performance by an expert and with the receiver sufficiently "warmed up" to stabilize circuitry, the calibration of the circuit may proceed. Initially, the photocell may be exposed to light, for example 50 foot candles of light for 20 seconds, to erase any memory effects. Then after selecting an unused receiver channel with no signals present and after reducing the receiver brightness control to a zero level, the switch contact 117 is engaged with the contact 122, and the resistor 128 is adjusted to obtain a predetermined reading on the meter 116, which may preferably be 90% of its full scale reading. The switch contact 117 is then engaged with contact 118, and the movable contacts of potentiometers 111 and 115, preferably ganged together as illustrated, are adjusted until a zero reading is obtained on the meter 116, so as to compensate for stray light. At this point, the contact 117 may be again engaged with contact 122, and the resistor 128 may be readjusted if necessary to obtain the same meter reading as before.

Then with the red and green guns of the picture tube disabled by means of appropriate switches, switch contact 117 is engaged with contact 118 and the receiver blue screen control is adjusted to its mid-range, the reading of the meter 116 being then noted and marked.

Next, with only the red gun operative, and with switch contact 117 engaged with contact 119, the resistor 124 is adjusted to obtain the same reading as noted in the previous step.

Next, with only the green gun operative, and with switch contact 117 engaged with contact 120, the resistor 126 is adjusted to again obtain the same reading.

As the next step, switch contact 117 may be engaged with contact 121 and with all guns except the red gun being disabled, the meter reading may be noted and marked. Then with both the red and green guns operative and the blue gun disabled, the meter reading may again be noted and marked, and finally with all three guns operative, the meter reading may be marked. Such points may be marked in red, yellow (red and green) and white (red, green and blue). By adjustment of the calibration control 125, such readings may be shifted to a convenient and uncluttered area of the scale.

After so calibrating the instrument, it may be used for adjustment of a color television receiver by performing the same steps, except that the adjustments of the resistors 124, 125 and 126 are unchanged, and the screen voltage adjustment resistors of the receiver are adjusted to obtain the same meter reading.

As an alternative method, the gun killer unit 18 need not be used, the screen voltage adjustment potentiometers may be initially placed in mid-range, and with switch contact 117 engaged with contact 121, the receiver brightness control may be adjusted to read at the point marked as white in the calibration procedure set for forth above. Then all screen voltage adjustment potentiometers are set at minimum positions, the red gun screen control is adjusted to read at the red mark, the green control is then adjusted to read at the yellow mark, and the blue control is then adjusted to read at the white mark.

Referring again to FIGURE 4, the vertical bar or line generator 23 is arranged to develop pulses at a multiple of the line rate. For example, the vertical line generator 23 may develop pulses at a rate equal to ten times the line rate. Thus, with a standard line rate of 15,750 per second, the vertical line generator 23 may develop pulses at a rate of 157,500 per second.

Similarly, the horizontal line generator 24 is operated at a multiple of the field rate and, for example, it may operate to generate pulses at the rate of 600 per second, or ten times the standard field rate of 60 per second. Such pulses, applied through the mixer 22 to the RF oscillator and modulator 20, and thence to the receiver, develop ten horizontal and ten vertical lines in a cross-hatch pattern on the screen 13.

The vertical oscillator synchronizing pulse generator 25 generates pulses at the field rate, i.e. 60 per second, which are applied to the mixer 22 to the RF oscillator and modulator 20 and thence to the receiver to synchronize the operation of the vertical deflection circuits 41 in the receiver, and to stabilize the cross-hatch pattern, the operation of the generators 23, 24 and 25 being locked in synchronism as hereinafter described.

As shown in FIGURE 4, the vertical line generator 23 comprises a pair of triodes 131 and 132 operated as a multivibrator. The cathode of the triode 131 is connected to ground, the grid thereof is connected through a resistor 133 to ground and the plate thereof is connected through resistor 134 to a power supply terminal 135. The cathode of the triode 132 is connected through a resistor 136 to ground, while the grid thereof is connected through a resistor 137 to ground and through a resistor 138 to a circuit point 139 which is connected to ground through a filter capacitor 140 and through an adjustable resistor 141 to a circuit point 142 which is connected through a switch 143 to the terminal 135, the plate or anode of the triode 132 being connected to circuit point 142 through a resistor 144. To obtain the multivibrator action, cross couplings are provided, a capacitor 145 being connected between the plate of the triode 131 and the grid of the triode 132, and a capacitor 146 being connected between the plate of the triode 132 and the grid of the triode 131.

With the switch 143 closed, the multivibrator operation is obtained, the frequency being controllable by adjustment of the resistor 141 to adjust the bias level of the triode 132.

In accordance with this invention, quite simple and inexpensive but yet highly effective means are provided for stabilizing the operation of the vertical line generator 23. In particular, the grid of the triode 131 is connected through a coupling capacitor 147 to a terminal 148 which is connected to ground through an adjustable resistor 150. Terminal 148 is connected through a line 151 to the member 62 of the photocell unit 12, a member 62 being of metal or other conductive material and being closely adjacent the screen 13 of the color kinescope 14. It is found that pulses of substantial amplitude are developed at the member 62 at the line rate (15,750 per second), apparently through electrostatic coupling screen 13 of the color kinescope 14. When such pulses are applied through the coupling capacitor 147 to the grid of the triode 131, the operation of the vertical bar or line generator 23 is synchronized with the operation of the horizontal deflection circuit of the television receiver. With this arrangement, the vertical bars or lines are developed with a high degree of stability.

The horizontal bar or line generator 24 comprises a pair of triodes 153 and 154 operated as a multivibrator. The cathode of the triode 153 is connected through a resistor 155 to ground, the grid thereof is connected through an adjustable resistor 156 to ground and through a capacitor 157 to the plate of the triode 154, and the plate of the triode 153 is connected through a resistor 158 to a power supply terminal 160. The cathode of the triode 154 is connected directly to ground, the grid thereof is connected through a resistor 161 to ground, through a capacitor 162 to the plate of the triode 153 and through a resistor 163, to the terminal 160, the plate of the triode 154 being connected through a resistor 164 to the terminal 160.

In accordance with this invention, the operation of the horizontal line generator 24 is synchronized with that of the vertical line generator 23 by applying output pulses from the generator 23 to the generator 24. In particular, the cathode of the triode 132 of the vertical line generator 23 is connected through a coupling capacitor 165 to the cathode of the triode 153 of the horizontal line generator 24.

The frequency of operation of the generator 24 may be controlled by adjustment of the resistor 156, which is also adjustable to obtain a stabilized lock between the operation of the generators 23 and 24.

The vertical oscillator synchronizing pulse generator 25 comprises a pair of triodes 167 and 168 operable as a multivibrator. The cathodes are connected together through a resistor 170 to ground while the grids are connected through resistors 171 and 172 to ground, resistor 172 being adjustable. The grid of the triode 167 is additionally connected through a resistor 173 to a power supply terminal 174 which is connected to the plates of the triodes 167 and 168 through resistors 175 and 176. Capacitors 177 and 178 are respectively connected between the plates of the triodes 167 and 168 and the grids of the triodes 168 and 167.

In accordance with this invention, the operation of the generator 25 is synchronized with that of the generator 24 and, in particular, the grid of the triode 167 is connected through a resistor 179 and a capacitor 180 to the anode or plate of the triode 154. In addition, or in the alternative, a synchronizing connection may be made to the photocell unit 12. In particular, the ungrounded terminal of the photocell 60 is connected through a switch 181 and a pulse-shaping network 182 to the grid of the triode 167. The illustrative network 182 comprises a resistor 183 and capacitors 184 and 185 in series between switch 181 and the grid of triode 167, with a pair of capacitors 186 and 187 and a variable resistor 188 connected in shunt relation.

The mixer 22 comprises a triode 190 having a plate connected through a resistor 191 to a power supply terminal 192, a cathode connected to ground through a resistor 193 and a grid connected through a resistor 194 to the cathode and through a resistor 195 to a circuit point 196 which is connected through a capacitor 196*a* to ground. Circuit point 196 is connected through a capacitor 197 to the line connecting capacitor 165 with the cathode of the triode 153, to thereby couple to the circuit point 186 signals from both the vertical line generator 23 and the horizontal line generator 24. The circuit point 196 is additionally connected through a capacitor 198 and a resistor 199 to the plate of the triode 168 of the vertical oscillator synchronizing pulse generator 25. It may here be noted that the pulses applied from the vertical and horizontal line generators 23 and 24 have a polarity which is the same but opposite to the polarity of the pulses from the generator 25, and they are applied to the RF oscillator and modulator 20 in a manner such that the pulses from the generator 25 operate as synchronizing pulses, while the pulses from the generators 23 and 24 cause brightening of the spot produced by the cathode ray beam in the kinescope 14, to thereby produce the horizontal and vertical lines.

The RF oscillator and modulator 20 comprises a pentode 200 having a cathode connected to ground, a control grid connected through a resistor 201 to ground, a screen grid connected through a coil 202 and a capacitor 203 to a power supply terminal 204 connected through a capacitor 205 to the control grid, a suppressor grid connected to ground, and a plate connected through a coil 206 and, if desired, a resistor 207 to the plate of the triode 190. A coil 208 is inductively coupled to the coil 202 and to output terminals which are connected through the lines 21 to the antenna input terminals of the receiver 11.

The rainbow generator 26 comprises a triode 210 having a cathode connected through a switch 211 to ground, a plate connected to the plate of the triode 190, and a grid connected through a resistor 212 to ground and through a capacitor 213 to a circuit point which is connected through a crystal 214 to ground, a tuning capacitor 215 being connected parallel with the crystal 214. The crystal is chosen to cause oscillation in a frequency of 3.56 mc., which can be varied slightly by the capacitor 215 in order to obtain the desired rainbow pattern on the screen 13 of the receiver 11, for testing operations as known in the art.

A further important feature of the invention is in the provision of the high voltage test circuit 27. The operation of this circuit is based upon the discovery that pulses are produced at the conductive member 62 of the photocell unit 12, disposed adjacent the screen 13, which have an amplitude having a direct functional relation to the magnitude of the high voltage applied to the kinescope 14. When the high voltage test circuit 27 is used, the switch 143 on the vertical line generator 23 is opened to disable the triode 132 and to permit use of the triode 131 as an amplifier, the grid of the triode 131 being coupled through the capacitor 147 to the member 62. Amplified pulses produced at the plate of the triode 131 are applied through a capacitor 217 to the grid of a triode 219 in the circuit 27, the grid being additionally connected through a resistor 220 to ground. The cathode of the triode 219 is connected through a resistor 221 to the ground while the plate thereof is connected through a resistor 222 to the power supply terminal 223. A second triode 224 is provided having a cathode connected through a resistor 225 to ground, a control grid connected through a resistor 226 to ground and a plate connected through an adjustable resistor 227 to the power supply terminal 223. This circuit operates as a vacuum tube volt meter, the plates of the triodes 219 and 224 being connected through the selector switch 17 to the meter 16, and the resistor 227 being adjustable for balance purposes.

A very important feature of the invention is in the incorporation of means in the instrument for applying a signal such as to produce dark areas of substantial width above and below certain of the scanning lines to facilitate visual observation of the registration of color components along such scanning lines.

Figure 6:
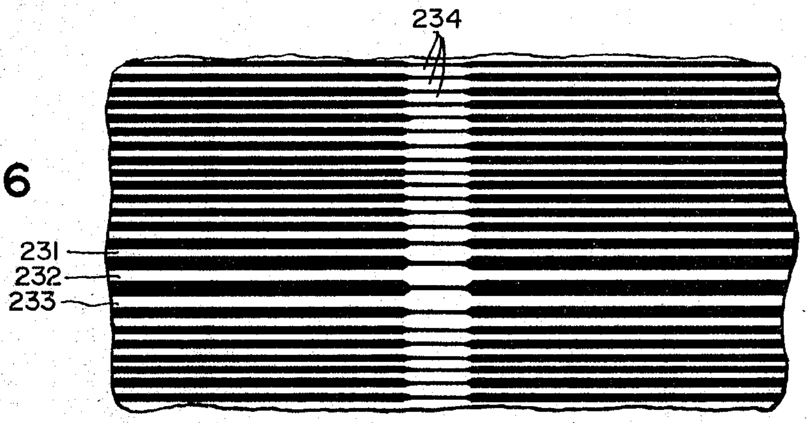
FIGURE 6 is a view showing a relatively small portion of the screen of the color kinescope of the receiver shown in FIGURE 1 and the form of cross-hatch pattern developed by the instrument of this invention.

FIGURE 6 illustrates a comparatively small portion of the pattern produced on the screen 13, showing the intersection of one horizontal bar and one vertical bar. The horizontal bar results from the higher intensity of certain scanning lines, particularly scanning lines 231, 232 and 233 in the portion of the pattern illustrated in FIGURE 6, while the vertical lines result from increased intensity and increased width or vertical dimension of portions of the lines in vertical alignment, as indicated by reference numeral 234. It is not of course possible to accurately portray such intensification of the lines on paper.

It will be noted that the lines 231, 232 and 233 in the illustrated pattern, and particularly the center line 232 have dark areas of substantial width (i.e. substantial vertical dimension) both above and below, so that they are more pronounced and more readily observed. As a result, the adjustment of the convergence circuits is much easier and can be performed much more precisely. Again, it should be noted that the intensification of illumination of the lines is difficult to portray on paper, and as a consequence, the improvement cannot be fully appreciated from the illustration of FIGURE 6.

Figure 7:
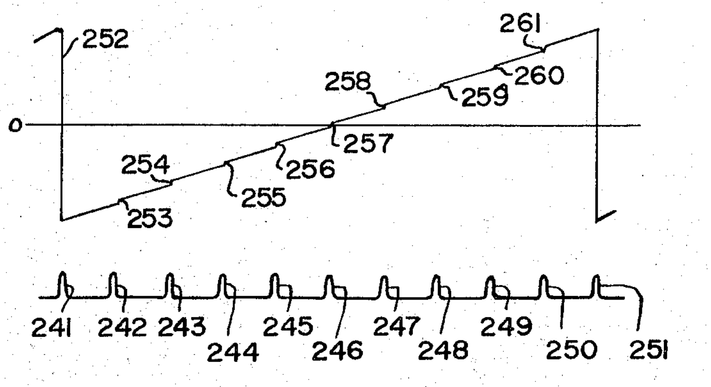
FIGURE 7 shows waveforms developed by and applied to the vertical deflection circuit of the color television receiver, through use of the instrument of this invention.

In accordance with a specific feature of the invention, the widened dark areas are produced by applying the pulses from the horizontal bar generator to the vertical deflection circuit within the receiver, with sufficient amplitude to cause coincident increases in the vertical sweep and to thereby cause vertical spreading of the lines at vertically spaced regions of the raster. With reference to FIGURE 7, the waveform at the lower portion of the figure shows a series of pulses 241–251 produced at the output of the detector circuit within the receiver, resulting from the pulses developed by the horizontal line generator 24. The waveform 252 in the upper portion of the figure represents the form of current through the vertical deflection coils. It will be noted that the first illustrated pulse 241 is coincident with the start of a vertical sweep interval. The next nine pulses 242–250 are effectively fed through the vertical oscillator circuit to produce coincident increases in the vertical sweep rate, as indicated by reference numerals 253–261. The eleventh illustrated pulse 251 is coincident with the start of another vertical sweep interval.

It will be appreciated that the dark areas may be produced by other means, but the illustrated arrangement is highly effective and yet is comparatively simple, while being very stable and reliable.

It will be further appreciated that the instrument is very flexible and versatile and can be used for a variety of measurements, adjustments and tests.

As an example of an additional adjustment, the combination of the photocell color measurement circuit with the cross-hatch generator permits very accurate adjustment of the gain control potentiometers 47 and 48. In particular, with the set-up switches 46 and 107 in the normal position as illustrated, the switch 90 is opened while switches 91 and 92 are closed as illustrated, to cut in only the red gun, assuming that the red gun is the one whose cathode is connected to the circuit point 45. The photocell 60 is then placed in a "blank" area, i.e. an area between vertical bars and between horizontal bars. The contrast control of the receiver is then set to zero and the brightness control is adjusted until a current through the meter 16 is at a predetermined value, as for example with pointer 97 aligned with the mark 99. The contrast control is then adjusted to mid-range and the reading on the meter is noted. The red gun is then cut out and the green gun is cut in, after which the green gain control (potentiometer 48) is adjusted to obtain the same reading as noted. The green gun is then cut out and the blue gun is cut in, while the blue gain control (potentiometer 47) is adjusted to again obtain the noted reading. The gain control potentiometers 47 and 48 are then adjusted for optimum operation.

It will be understood that modifications and variations may be effected without departing from the spirit and scope of the novel concepts of this invention.

I claim as my invention:

1. In an instrument for servicing a color television receiver which includes a kinescope of the type having three electron guns and a masked tri-colored-phosphor screen, means for supplying operating voltages to said guns, means for applying a luminance signal to all of said guns, and means for applying individual chrominance signals to said guns, photocell means arranged for disposition adjacent a portion of said screen, measuring means responsive to the output of said photocell means and arranged for indicating the respective light outputs from said phosphors, and calibration means associated with said measuring means for permitting adjustment of said operating voltages of said guns to obtain predetermined light outputs from the respective phosphors while no chrominance signals are applied to said guns, said predetermined light outputs being such that a black-and-white reproduction is obtained in response to application of a luminance signal alone to said guns.

2. In an instrument for servicing a color television receiver which includes a kinescope of the type having three electron guns and a masked tri-colored-phosphor screen, a horizontal deflection circuit operable at a line rate and a vertical deflection circuit operable at a field rate for producing on said screen a raster composed of vertically spaced scanning lines, convergence circuits for controlling registration throughout said raster of color components respectively produced by said guns, a detector circuit, RF and IF circuits for applying a signal to said detector circuit, an amplifier circuit for applying an output video signal from said detector circuit to said kinescope, and synchronizing circuits coupled to said detector circuit for applying synchronizing signals to said horizontal and vertical deflection circuits, a first multivibrator for producing pulses at a predetermined frequency equal to a multiple of said field rate, a second multivibrator for producing pulses at a frequency equal to a multiple of said line rate, means responsive to said pulses from said first and second multivibrators for applying signals to said receiver to cause application of corresponding video pulses from said amplifier to said kinescope and to produce a cross-hatch pattern of vertically spaced horizontal lines and horizontally spaced vertical lines on said screen, pick-up means arranged to be disposed adjacent said screen to derive a periodic control signal therefrom, and means for applying said control signal to at least one of said multivibrators to synchronize the operation of said one of said multivibrators with the scanning of said screen.

3. In an instrument for servicing a color television receiver which includes a kinescope of the type having three electron guns and a masked tri-colored-phosphor screen, means for applying operating voltages to said guns, a horizontal deflection circuit operable at a line rate and a vertical deflection circuit operable at a field rate for producing on said screen a raster composed of vertically spaced scanning lines, convergence circuits for controlling registration throughout said raster of color components respectively produced by said guns, a detector circuit, RF and IF circuits for applying a signal to said detector circuit, an amplifier circuit coupled to said detector circuit for applying a luminance signal to all of said guns, a color demodulator coupled to said detector circuit for applying individual chrominance signals to said guns, and synchronizing circuits coupled to said detector circuit for applying synchronizing signals to said horizontal and vertical deflection circuits, first and second multivibrators for producing pulses at frequencies respectively equal to multiples of said field and line rates, means responsive to said pulses for applying signals to said receiver to cause application of corresponding video pulses from said amplifier to said guns and to produce a cross-hatch pattern on said screen, photocell means arranged to be disposed adjacent a portion of said screen to develop an output signal corresponding to the intensity of light from said portion of said screen and to also develop a periodic control signal, means for applying said control signal to at least one of said multivibrators to synchronize the operation of said one of said multivibrators with the scanning of said screen, measuring means responsive to said output signal from said photocell means and arranged for indicating the respective light outputs from individual phosphors of said screen, and calibration means associated with said measuring means for permitting adjustment of said operating voltages of said guns to obtain predetermined light outputs from the respective phosphors while no chrominance signals are applied to said guns.

4. In an instrument for servicing a color television receiver which includes a kinescope type having three electron guns and a masked tri-colored-phosphor screen, means for supplying operating voltages to said guns, means for applying a luminance signal to all of said guns, and means for applying individual chrominance signals to said guns, switch means for connection to said receiver for permitting selective operation of individual ones of said guns, photocell means arranged for disposition adjacent a portion of said screen, measuring means responsive to the output of said photocell means and arranged for indicating the respective light outputs from said phosphors, and calibration means associated with said measuring means for permitting adjustment of said operating voltages of said guns to obtain predetermined light outputs from the respective phosphors while no chrominance signals are applied to said guns, said predetermined light outputs being such that a black-and-white reproduction is obtained in response to application of a luminance signal alone to said guns.

5. In an instrument for servicing a color television receiver which includes a kinescope of the type having three electron guns and a masked tri-colored-phosphor screen, means for supplying operating voltages to said guns, and means for applying individual chrominance signals to said guns, photocell means arranged for disposition adjacent a portion of said screen, measuring means including a meter responsive to the output of said photocell means and arranged for indicating the respective light outputs from said phosphors, and calibration means associated with said measuring means for permitting adjustment of said operating voltages of said guns to obtain predetermined light outputs from the respective phosphors while no chrominance signals are applied to said guns, said calibration means comprising a plurality of calibration resistors respectively corresponding to said phosphors, and means for selectively connecting said calibration resistors in circuit with said meter for obtaining the same current flow through said meter in response to the light from each individual phosphor when said operating voltages are properly adjusted.

6. In an instrument for servicing a color television receiver which includes a kinescope of the type having three electron guns and a masked tri-colored-phosphor screen, means for supplying operating voltages to said guns, and means for applying individual chrominance signals to said guns, photocell means arranged for disposition adjacent a portion of said screen, measuring means including a meter responsive to the output of said photocell means and arranged for indicating the respective light outputs from said phosphors, and calibration means associated with said measuring means for permitting adjustment of said operating voltages of said guns to obtain predetermined light outputs from the respective phosphors while no chrominance signals are applied to said guns, said calibration means comprising a scale for said meter having marks thereon respectively corresponding to the current flows produced in said meter in response to the light from individual phosphors when said operating voltages are properly adjusted.

7. In an instrument for servicing a color television receiver which includes a kinescope of the type having three electron guns and a masked tri-colored-phosphor screen, means for supplying operating voltages to said guns, means for applying a luminance signal to all of said guns, and means for applying individual chrominance signals to said guns, first switch means for connection to said receiver for permitting selective operation of individual ones of said guns, photocell means arranged for disposition adjacent a portion of said screen, measuring means including a meter responsive to the output of said photocell means and arranged for indicating the respective light outputs from said phosphors, and calibration means associated with said measuring means for permitting adjustment of said operating voltages of said guns to obtain predetermined light outputs from the respective phosphors while no chrominance signals are applied to said guns, said calibration means comprising a plurality of calibration resistors respectively corresponding to said phosphors, and second switch means ganged to said first switch means and arranged for selectively connecting said calibration resistors in circuit with said meter.

8. In a method of adjusting a color television receiver which includes a kinescope having a screen, phosphors of first, second and third colors in said screen and first, second and third electron guns, means for applying a luminance signal to all of said guns and means for applying individual chrominance signals to said guns, the steps of providing photocell means and measuring means connected to said photocell means, placing said photocell means adjacent a portion of said screen, operating said receiver without application of chrominance signals to said guns, operating said first electron gun alone while adjusting operating voltages for said first gun to obtain a predetermined measured output from said photocell means, then operating said second electron gun while adjusting operating voltages for said second gun to obtain a predetermined measured output from said photocell means, and then operating said third electron gun while adjusting operating voltages for said third electron gun to obtain a predetermined measured output from said photocell means.

9. In a method of adjusting a color television receiver which includes a kinescope having a screen, phosphors of first, second and third colors in said screen and first, second and third electron guns, means for applying a luminance signal to all of said guns and means for applying individual chrominance signals to said guns, the steps of providing photocell means and measuring means connected to said photocell means, placing said photocell means adjacent a portion of said screen, operating said receiver without application of chrominance signals to said guns, operating said first electron gun alone while adjusting operating voltages from said photocell means, then operating said second electron gun while adjusting operating voltages for said second electron gun to obtain said predetermined measured output from said photocell means, and then operating said third electron gun alone while adjusting operating voltages for said third electron gun to obtain said predetermined measured output from said photocell means.

10. In a method of adjusting a color television receiver which includes a kinescope having a screen, phosphors of first, second and third colors in said screen, and first, second and third electron guns, means for applying a luminance signal to all of said guns and means for applying individual chrominance signals to said guns, the steps of providing photocell means and measuring means connected to said photocell means, placing said photocell means adjacent a portion of said screen, operating said receiver without application of chrominance signals to said guns, reducing the operating voltages of all of said guns to substantially cut off excitation of said phosphors, increasing the operating voltage of said first gun to obtain a first predetermined measured output from said photocell means, increasing the operating voltage of said second gun to obtain a second predetermined measured output from said photocell means, and increasing the operating voltage of said third gun to obtain a third predetermined measured output from said photocell means.

11. In a method of adjusting a color television receiver which includes a kinescope having a screen, phosphors of first, second and third colors in said screen, and first, second and third electron guns, means for adjusting operating voltages of said guns, means for applying a luminance signal to all of said guns including gain control means associated with said second and third guns for adjusting the relative proportion of the signals applied to said guns, means for applying individual chrominance signals to said guns, and contrast and brightness controls, the steps of providing photocell means and measuring means connected to said photocell means, placing said photocell means adjacent a portion of said screen, applying operating voltages to said first gun alone, adjusting said contrast control to a minimum setting, adjusting said brightness control to produce a predetermined output from said photocell means, adjusting said contrast control to a mid-range setting to obtain a certain output from said photocell means differing from said predetermined output, applying operating voltages to said second gun alone, adjusting said gain control means to obtain said certain output from said photocell means, applying operating voltages to said third gun alone, and adjusting said gain control means to again obtain said certain output from said photocell means.

12. In an instrument for servicing a color television receiver which includes a kinescope of the type having three electron guns and a masked tri-colored-phosphor screen, a horizontal deflection circuit operable at a line rate and a vertical deflection circuit operable at a field rate for producing on said screen a raster composed of vertically spaced scanning lines, convergence circuits for controlling registration throughout said raster of color components respectively produced by said guns, a detector circuit, RF and IF circuits for applying a signal to said detector circuit, an amplifier circuit for applying an output video signal from said detector circuit to said kinescope, and synchronizing circuits coupled to said detector circuit for applying synchronizing signals to said horizontal and vertical deflection circuits, a multivibrator for producing pulses at a frequency equal to a multiple of said line rate, means responsive to said pulses for applying a signal to said receiver to cause application of corresponding video pulses from said amplifier to said kinescope and to produce horizontally spaced vertical lines on said screen, pick-up means arranged to be disposed adjacent said screen to derive therefrom a control signal at said line rate, and means for applying said control signal to said multivibrator to synchronize the operation of said multivibrator with said horizontal deflection circuit.

13. In an instrument for servicing a color television receiver which includes a kinescope of the type having three electron guns and a masked tri-colored-phosphor screen, a horizontal deflection circuit operable at a line rate and a vertical deflection circuit operable at a field rate for producing on said screen a raster composed of vertically spaced scanning lines, convergence circuits for controlling registration throughout said raster of color components respectively produced by said guns, a detector circuit, RF and IF circuits for applying a signal to said detector circuit, an amplifier circuit for applying an output video signal from said detector circuit to said kinescope, and synchronizing circuits coupled to said detector circuit for applying synchronizing signals to said horizontal and vertical deflection circuits, a multivibrator for producing pulses at a frequency equal to a multiple of said field rate, means responsive to said pulses for applying a signal to said receiver to cause application of corresponding video pulses from said amplifier to said kinescope and to produce vertically spaced horizontal lines on said screen, pick-up means arranged to be disposed adjacent said screen to derive therefrom a control signal, and means for applying said control signal to said multivibrator to synchronize the operation of said multivibrator with the scanning of said screen.

14. In an instrument for servicing a color television receiver which includes a kinescope of the type having three electron guns and a masked tri-colored-phosphor screen, a horizontal deflection circuit operable at a line rate and a vertical deflection circuit operable at a field rate for producing on said screen a raster composed of vertically spaced scanning lines, convergence circuits for controlling registration throughout said raster of color components respectively produced by said guns, a detector circuit, RF and IF circuits for applying a signal to said detector circuit, an amplifier circuit for applying an output video signal from said detector circuit to said kinescope, and synchronizing circuits coupled to said detector circuit for applying synchronizing signals to said horizontal and vertical deflection circuits, a multivibrator for producing pulses at a frequency equal to a multiple of one of said rates, means responsive to said pulses for applying a signal to said receiver to cause application of corresponding video pulses from said amplifier to said kinescope, pick-up means of conductive material arranged to be disposed adjacent said screen for electrostatic coupling to derive therefrom a control signal, and means for applying said control signal to said multivibrator.

15. In an instrument as defined in claim 14, photocell means for measuring light from said screen, and housing means associated with said photocell means and defining said pick-up means of conductive material.

16. In an instrument for servicing a color television receiver which includes a kinescope of the type having three electron guns and a masked tri-colored-phosphor screen, a horizontal deflection circuit operable at a line rate and a vertical deflection circuit operable at a field rate for producing on said screen a raster composed of vertically spaced scanning lines, convergence circuits for controlling registration throughout said raster of color components respectively produced by said guns, a detector circuit, RF and IF circuits for applying a signal to said detector circuit, an amplifier circuit for applying an output video signal from said detector circuit to said kinescope, and synchronizing circuits coupled to said detector circuit for applying synchronizing signals to said horizontal and vertical deflection circuits, means for producing pulses at a frequency equal to a multiple of said field rate, and means responsive to said pulses for applying a signal to said receiver to apply corresponding pulses to said vertical deflection circuit to synchronize the operation of said vertical deflection circuit, said corresponding pulses having an amplitude sufficient to cause the coincident increase in the vertical sweep rate and to cause vertical spreading of lines at vertically spaced regions of said raster and to produce blank areas of substantial width above and below scanning lines in said regions.

17. In an instrument for servicing a color television receiver which includes a kinescope of the type having three electron guns and a masked tri-colored-phosphor screen, a horizontal deflection circuit operable at a line rate and a vertical deflection circuit operable at a field rate for producing on said screen a raster composed of vertically spaced scanning lines, convergence circuits for controlling registration throughout said raster of color components respectively produced by said guns, a detector circuit, RF and IF circuits for applying a signal to said detector circuit, an amplifier circuit for applying an output video signal from said detector circuit to said kinescope, and synchronizing circuits coupled to said detector circuit for applying synchronizing signals to said horizontal and vertical deflection circuits, means for applying a signal to said receiver for brightening certain of said scanning lines and for producing blank areas of substantial width above and below said certain scanning lines to facilitate visual observation of the registration of color components along said certain scanning lines.

18. In an instrument for servicing a television receiver which includes a kinescope having a screen and a fly-back high voltage supply for supplying a high voltage to said kinescope, a member of conductive material adapted to be positioned adjacent said screen to be electrostatically coupled thereto and to develop a signal having an amplitude functionally related to the magnitude of said high voltage, and means for measuring the amplitude of said signal.

19. In an instrument for servicing a color television receiver which includes a kinescope of the type having three electron guns and a masked tri-colored-phosphor screen, a horizontal deflection circuit operable at a line rate and a vertical deflection circuit operable at a field rate for producing on said screen a raster composed of vertically spaced scanning lines, a fly-back high voltage supply associated with said horizontal deflection circuit and arranged for applying a high voltage to said kinescope, convergence circuits for controlling registration throughout said raster of color components respectively produced by said guns, a detector circuit, RF and IF circuits for applying a signal to said detector circuit, an amplifier circuit for applying an output video signal from said detector circuit to said kinescope, and synchronizing circuits coupled to said detector circuit for applying synchronizing signals to said horizontal and vertical deflection circuits, a multivibrator for producing pulses at a frequency equal to a multiple of said line rate, means responsive to said pulses for applying a signal to said receiver to cause application of corresponding video pulses from said amplifier to said kinescope and to produce horizontally spaced vertical lines on said screen, pick-up means arranged to be disposed adjacent said screen to derive therefrom a control signal at said line rate, means for applying said control signal to said multivibrator to synchronize the operation of said multivibrator with said horizontal deflection circuit, and means for measuring the amplitude of said control signal to indicate the magnitude of said high voltage.

20. In an instrument for servicing a color television receiver which includes a kinescope of the type having three electron guns and a masked tri-colored-phosphor screen, a horizontal deflection circuit operable at a line rate and a vertical deflection circuit operable at a field rate for producing on said screen a raster composed of vertically spaced scanning lines, convergence circuits for controlling registration throughout said raster of color components respectively produced by said guns, a detector circuit, RF and IF circuits for applying a signal to said detector circuit, an implifier circuit for applying an output video signal from said detector circuit to said kinescope, synchronizing circuits coupled to said detector circuit for applying synchronizing signals to said horizontal and vertical deflection circuits, and means for applying a signal to said receiver for periodically increasing the vertical sweep rate during certain time intervals to cause spreading of scanning lines during said certain time intervals and to produce blank areas of substantial width above and below certain scanning lines.

References Cited by the Examiner

UNITED STATES PATENTS

| | | | |
|---|---|---|---|
| 2,499,039 | 2/1950 | Simmon | 178—6 |
| 2,763,833 | 9/1956 | Brumbaugh | 178—6 |
| 2,855,515 | 10/1958 | Bernard | 178—6 |
| 2,956,116 | 10/1960 | Singelman | 178—6 |

DAVID G. REDINBAUGH, *Primary Examiner.*

J. A. O'BRIEN, *Assistant Examiner.*